US007707122B2

(12) United States Patent
Hull et al.

(10) Patent No.: US 7,707,122 B2
(45) Date of Patent: Apr. 27, 2010

(54) SYSTEM AND METHOD OF INFORMATION FILTERING USING MEASURES OF AFFINITY OF A RELATIONSHIP

(75) Inventors: Mark Everett Hull, San Jose, CA (US); F. Randall Farmer, Palo Alto, CA (US); Ellen Sue Perelman, San Francisco, CA (US)

(73) Assignee: Yahoo ! Inc., Sunnyvale, CA (US)

( * ) Notice: Subject to any disclaimer, the term of this patent is extended or adjusted under 35 U.S.C. 154(b) by 38 days.

(21) Appl. No.: 10/946,636

(22) Filed: Sep. 21, 2004

(65) Prior Publication Data

US 2005/0171955 A1     Aug. 4, 2005

Related U.S. Application Data

(60) Provisional application No. 60/540,505, filed on Jan. 29, 2004, provisional application No. 60/544,639, filed on Feb. 13, 2004.

(51) Int. Cl.
*G06Q 10/00* (2006.01)
*G06Q 30/00* (2006.01)
*G06F 7/00* (2006.01)
*G06F 17/30* (2006.01)

(52) U.S. Cl. ......................................... 705/319; 707/10
(58) Field of Classification Search ...................... 705/1
See application file for complete search history.

(56) References Cited

U.S. PATENT DOCUMENTS

| 5,835,087 A | 11/1998 | Herz et al. |
| 5,950,193 A | 9/1999 | Kulkarni |
| 5,996,006 A | 11/1999 | Speicher |

(Continued)

FOREIGN PATENT DOCUMENTS

JP     2004-272423     9/2004

OTHER PUBLICATIONS

BusinessWeek Online, "Diller's Latest Little Bet on the Net", Mar. 1, 2004, 2 pp., Available at http://www.businessweek.com:/print/technology/content/mar2004/tc20004031_2820_tc119.h...

(Continued)

*Primary Examiner*—John G Weiss
*Assistant Examiner*—Shaun Sensenig
(74) *Attorney, Agent, or Firm*—Darby & Darby PC; John W. Branch

(57) ABSTRACT

A system, apparatus, and method are directed towards enabling information filtering using measures of an affinity of a relationship between subscribers of an online portal system. The affinity of a relationship may be determined based, in part, on the tracking of various online behaviors of and between subscribers of the portal system. Any of a variety of behaviors may be tracked, including message communications between subscribers, participation in instant messaging groups, purchases, activities, categories, and so forth. Such behaviors may be employed to determine a level of trust (or affinity) between subscribers of the portal system. This affinity measurement may be used to filter various information, including, but not limited to, product recommendations, ratings, polling queries, advertising, social network communications, personal ads, search results, and the like. Moreover, this affinity measurement may also be employed to perform message spam detection.

21 Claims, 5 Drawing Sheets

U.S. PATENT DOCUMENTS

| | | | |
|---|---|---|---|
| 6,029,141 | A | 2/2000 | Bezos et al. |
| 6,129,141 | A | 10/2000 | Yang et al. |
| 6,175,831 | B1 | 1/2001 | Weinreich et al. |
| 6,269,369 | B1 | 7/2001 | Robertson |
| 6,296,369 | B1 * | 10/2001 | Liao ........................... 362/186 |
| 6,324,541 | B1 | 11/2001 | de l'Etraz et al. |
| 6,327,573 | B1 | 12/2001 | Walker et al. |
| 6,356,879 | B2 | 3/2002 | Aggarwal et al. |
| 6,433,795 | B1 | 8/2002 | MacNaughton et al. |
| 6,449,344 | B1 | 9/2002 | Goldfinger et al. |
| 6,466,917 | B1 | 10/2002 | Goyal et al. |
| 6,606,657 | B1 | 8/2003 | Zilberstein et al. |
| 6,681,247 | B1 * | 1/2004 | Payton ........................ 709/217 |
| 6,714,931 | B1 | 3/2004 | Papierniak et al. |
| 6,745,178 | B1 | 6/2004 | Emens et al. |
| 6,879,994 | B1 | 4/2005 | Matsliach et al. |
| 7,080,117 | B2 * | 7/2006 | de Pinto et al. ............. 709/203 |
| 7,143,052 | B2 * | 11/2006 | LaSalle et al. ................. 705/7 |
| 7,167,910 | B2 * | 1/2007 | Farnham et al. ............. 709/223 |
| 7,200,638 | B2 | 4/2007 | Lake |
| 7,512,653 | B2 | 3/2009 | Krishnasamy et al. |
| 2001/0032245 | A1 | 10/2001 | Fodor |
| 2002/0023132 | A1 | 2/2002 | Tornabene et al. |
| 2002/0023230 | A1 | 2/2002 | Bolnick et al. |
| 2002/0099806 | A1 | 7/2002 | Balsamo et al. |
| 2002/0103797 | A1 | 8/2002 | Goel et al. |
| 2002/0116466 | A1 | 8/2002 | Trevithick et al. |
| 2002/0124053 | A1 | 9/2002 | Adams et al. |
| 2003/0037114 | A1 | 2/2003 | Nishio et al. |
| 2003/0050977 | A1 | 3/2003 | Puthenkulam et al. |
| 2003/0105827 | A1 | 6/2003 | Tan et al. |
| 2003/0158855 | A1 | 8/2003 | Farnham et al. |
| 2003/0167324 | A1 | 9/2003 | Farnham et al. |
| 2003/0231207 | A1 | 12/2003 | Huang |
| 2004/0044536 | A1 | 3/2004 | Fitzpatrick et al. |
| 2004/0088315 | A1 | 5/2004 | Elder et al. |
| 2004/0088322 | A1 | 5/2004 | Elder et al. |
| 2004/0088325 | A1 | 5/2004 | Elder et al. |
| 2004/0103203 | A1 | 5/2004 | Nichols et al. |
| 2004/0119760 | A1 | 6/2004 | Grossman et al. |
| 2004/0122681 | A1 | 6/2004 | Ruvolo et al. |
| 2004/0122803 | A1 * | 6/2004 | Dom et al. ...................... 707/3 |
| 2004/0122855 | A1 * | 6/2004 | Ruvolo et al. ............ 707/104.1 |
| 2004/0133440 | A1 | 7/2004 | Carolan et al. |
| 2004/0148275 | A1 * | 7/2004 | Achlioptas ..................... 707/3 |
| 2004/0199765 | A1 | 10/2004 | Kohane et al. |
| 2004/0215648 | A1 | 10/2004 | Marshall et al. |
| 2004/0215793 | A1 | 10/2004 | Ryan et al. |
| 2005/0015432 | A1 | 1/2005 | Cohen |
| 2005/0015455 | A1 | 1/2005 | Liu |
| 2005/0076021 | A1 | 4/2005 | Wu et al. |
| 2006/0218153 | A1 | 9/2006 | Voon et al. |
| 2006/0242128 | A1 | 10/2006 | Goel |
| 2007/0027921 | A1 | 2/2007 | Alvarado et al. |

OTHER PUBLICATIONS

Ethier, Jason "Current Research in Social Network Theory", 10 pp., Available at http://upaya.soc.neu.edu/archive/students/Ethier-SocialNetworks.html.

Dragan, Richard V. PC Magazine. Jan. 20, 2004. Tribe.net(beta). 5pp. Available: http//:www.pcmag.com/article2/0,1759,1418688,00.asp.

FAQs., "About the ZeroDegrees Service" 35 pp., Available at http://www.zerodegrees.com/faq.htm.

Matt Hines, "America Online proposes Love.com", Dec. 10, 2003, pp. 1-3, can be found at http://news.com.com/2100-1032-5118986.html.

Matt Hines, "AOL serves up software for BREW", Dec. 9, 2003, pp. 1-3, can be found at http://news.com.com/2100-1038-5117686.html.

Lorrie Faith Cranor et al., "Spam," Communications of the ACM. Aug. 1998, pp. 74-83, vol. 41, No. 8.

Ken Jordan et al., "The Augmented Social Network: Building identity and trust into the next-generation internet," First Monday Peer-Reviewed Journal on the Internet, (Jul. 2003) <http://www.firstmonday.dk/issues/issue8_8/jordan/>.

"Welcome to the Christian Connection Matchmaker", archive.org website of www.christian.matchmaker.com, Feb. 21, 1999.

"The Purpose Principles and Process", archive.org website of www.christian.matchmaker.com, Feb. 24, 1999.

"A Sneak Preview of the Christian Connection Matchmaker Search Page", archive.org website of www.christian.matchmaker.com, May 8, 1999.

"A Sneak Preview of the Christian Connection Matchmaker Match Page", archive.org website of www.christian.matchmaker.com, Feb. 23, 1999.

"Yahoo! Groups—What is a Group?", archive.org website of www.yahoo.com, Nov. 3, 2002.

"Yahoo! Groups—Getting Started, Groups Account, Groups Features", archive.org website of www.yahoo.com, Oct. 31, 2002.

"Yahoo! Groups—What is the spam policy of Yahoo! Groups? How do I avoid spam?", archive.org website of www.yahoo.com, Oct. 24, 2002.

Merrick, Amy; "The Best Way to . . . Find a Date—Ok, so true love isn't guaranteed; But there are ways to better the odds", Wall Street Journal, New York, NY, p. R 16, ProQuest ID 64669169, Nov. 27, 2000.

Member site Selection Page for Matchmaker.com, web.archive.org webpage of Feb. 19, 1999, web.archive.org/web/19990219183131/matchmaker.com/newtry.shtml.

Welcome to the Christian Connection Matchmaker, web archive.org webpage of Feb. 22, 1999, web.archive.org/web/19990222170152/http://www.Christian.email.net/index/html.

Matchmaker.com Disclaimer, web.archive.org webpage of Apr. 20, 2000, web.archive.org/web/20000420114350/www.Christian.matchmaker.com/rules.

International Preliminary Report on Patentability dated Dec. 14, 2006 Issued for corresponding International Patent Application No. PCT/US2004/038703.

Written Opinion, mail date Oct. 3, 2006, for International Application No. PCT/USO4/38696.

International Search Report, mail date Oct. 3, 2006 of International Application No. PCT/US04/38696.

International Preliminary Report on Patentability dated Dec. 14, 2006 issued for corresponding International Patent Application No. PCT/US2004/038703.

"System Names and Numbers," archive.org website of www.christian.matchmaker.com, Apr. 24, 1999, p. 1-3.

"Matchmaker User Tools Pages," archive.org website of www.christian.matchmaker.com, Apr. 24, 1999, pp. 1-2.

"Matchmaker Help—Block," archive.org website of www.christian.matchmaker.com, Sep. 10, 1999, p. 1.

"Matchmaker Help—Main Page," archive.org website of www.christian.matchmaker.com, Oct. 4, 1999, p. 1-3.

"A Sneak Preview of the Christian Connection Matchmaker Who's On Page," Feb. 24, 1999, 3 pgs, archive.org website of www.christian.matchmaker.com, (accessed Jul. 28, 2007).

Welcome to My Yahoo!, 2 pgs., archive.org website of www.yahoo.com/r/il (accessed Feb. 15, 2007).

MatchMaker Help Pages—Frequently Asked Questions, 7 pgs., archive.org website of www.christian.matchmaker.com (accessed Feb. 15, 2007).

U.S. Appl. No. 10/832,172, Official Communication mailed May 16, 2007.

U.S. Appl. No. 10/832,172, Official Communication mailed Feb. 9, 2007.

U.S. Appl. No. 10/832,172, Official Communication mailed Aug. 23, 2006.

U.S. Appl. No. 10/946,630, Official Communication mailed Jul. 27, 2007.

U.S. Appl. No. 10/946,630, Official Communication mailed May 2, 2007.

U.S. Appl. No. 10/946,630, Official Communication mailed Feb. 6, 2007.

U.S. Appl. No. 10/946,630, Official Communication mailed Aug. 16, 2006.
U.S. Appl. No. 10/866,954, Official Communication mailed Aug. 8, 2007.
U.S. Appl. No. 10/866,954, Official Communication mailed Feb. 23, 2007.
U.S. Appl. No. 10/866,954, Official Communication mailed Jul. 26, 2006.
U.S. Appl. No. 10/866,954, Official Communication mailed Feb. 1, 2006.
U.S. Appl. No. 10/866,954, Official Communication mailed Mar. 16, 2005.
U.S. Appl. No. 11/314,201, Official Communication mailed May 17, 2007.
U.S. Appl. No. 10/863,926, Official Communication mailed Jun. 26, 2007.
U.S. Appl. No. 10/863,926, Official Communication mailed Dec. 29, 2006.
U.S. Appl. No. 10/863,926, Official Communication mailed Aug. 14, 2006.
U.S. Appl. No. 10/863,926, Official Communication mailed Feb. 28, 2006.
U.S. Appl. No. 10/863,926, Official Communication mailed Sep. 9, 2005.
U.S. Appl. No. 10/863,926, Official Communication mailed Apr. 6, 2005.
Written Opinion dated Oct. 3, 2006, for International Application PCT/US04/38696, filed Nov. 17, 2004.
U.S. Appl. No. 11/314,201, Official Communication mailed Nov. 1, 2007.
U.S. Patent and Trademark Office, Office Communication mailed Dec. 8, 2008 for corresponding U.S. Appl. No. 11/314,204 (33 pages).
The Official America Online for Windows Tour Guide, Second Edition. Copyright 1994 Tom Lichty. pp. 239-256.
U.S. Appl. No. 10/946,630, Official Communication mailed Oct. 16, 2008.
U.S. Appl. No. 11/392,247, Official Communication mailed Nov. 4, 2008.
U.S. Appl. No. 10/863,926, Official Communication mailed Jan. 12, 2009.
Office Communication for U.S. Appl. No. 10/863,926, mailed on May 14, 2009.
U.S. Appl. No. 10/946,630 Office Communication mailed Jun. 12, 2009.
U.S. Appl. No. 11/392,247, Official Communication mailed Apr. 16, 2009.
"The Matchmaker Network Systems Page," System names and Numbers, 3 pages, http://web.archive.org/web/19990424123143/www.christian.matchmaker.com/systems (accessed Feb. 15, 2007).
U.S. Patent and Trademark Office Communication mailed Jul. 9, 2009 for corresponding U.S. Appl. No. 11/314,206.
Office Communication for U.S. Appl. No. 10/946,630, mailed Oct. 26, 2009 (14 pages).
Office Communication for U.S. Appl. No. 10/866,954, mailed Sep. 2, 2009 (30 pages).
Office Communication for U.S. Appl. No. 10/863,926, mailed Sep. 29, 2009 (12 pages).

* cited by examiner

SYSTEM AND METHOD OF INFORMATION FILTERING USING MEASURES OF AFFINITY OF A RELATIONSHIP

CROSS-REFERENCE TO RELATED APPLICATIONS

This application claims the benefit of U.S. Provisional Application, titled "System and Method for Social Networking," Ser. No. 60/544,639 filed on Feb. 13, 2004, and U.S. Provisional Application, titled "System and Method for Social Networking," Ser. No. 60/540,505 filed on Jan. 29, 2004, the benefit of the earlier filing date of which is hereby claimed under 35 U.S.C. §119(e), and further each are incorporated by reference.

FIELD OF THE INVENTION

The present invention relates generally to computing software, and more particularly, but not exclusively to a system and method for enabling information filtering using measures of affinity of a relationship between subscribers in a subscriber-based portal system.

BACKGROUND OF THE INVENTION

Social networking is a concept that an individual's personal network of friends, family colleagues, coworkers, and the subsequent connections within those networks, can be utilized to find more relevant connections for dating, job networking, service referrals, activity partners, and the like.

A social network typically comprises a person's set of direct and indirect personal relationships. Direct personal relationships usually include relationships with family subscribers, friends, colleagues, coworkers, and other people with which the person has had some form of direct contact, such as contact in person, by telephone, by email, by instant message, by letter, and the like. These direct personal relationships are sometimes referred to as first-degree relationships. First-degree relationships can have varying degrees of closeness, trust, and other characteristics. These relationships can also be unidirectional or bidirectional. A unidirectional relationship typically means that a first person is willing and able to interact with a second person, but the second person may not be willing or able to interact with the first person. Conversely, a bidirectional relationship typically means that both people are willing and able to interact with each other.

Indirect personal relationships typically include relationships through first-degree relationships to people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second-degree relationship.

The above personal relationships, and others, can be utilized to find and develop relevant connections for a variety of objectives. Finding and developing relevant connections can be accelerated with online services. Such online social networking can be used to mine personal and/or interest relationships in a way that is often more difficult and/or time-consuming to do offline.

Thus, there has been a flurry of companies launching services that help people to build and mine their personal networks. However, these efforts have been predominately directed towards dating and job opportunities. Many of these companies are struggling with developing additional services that will build customer loyalty. Without the ability to extend the value of the existing networks, social networking loses its appeal. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
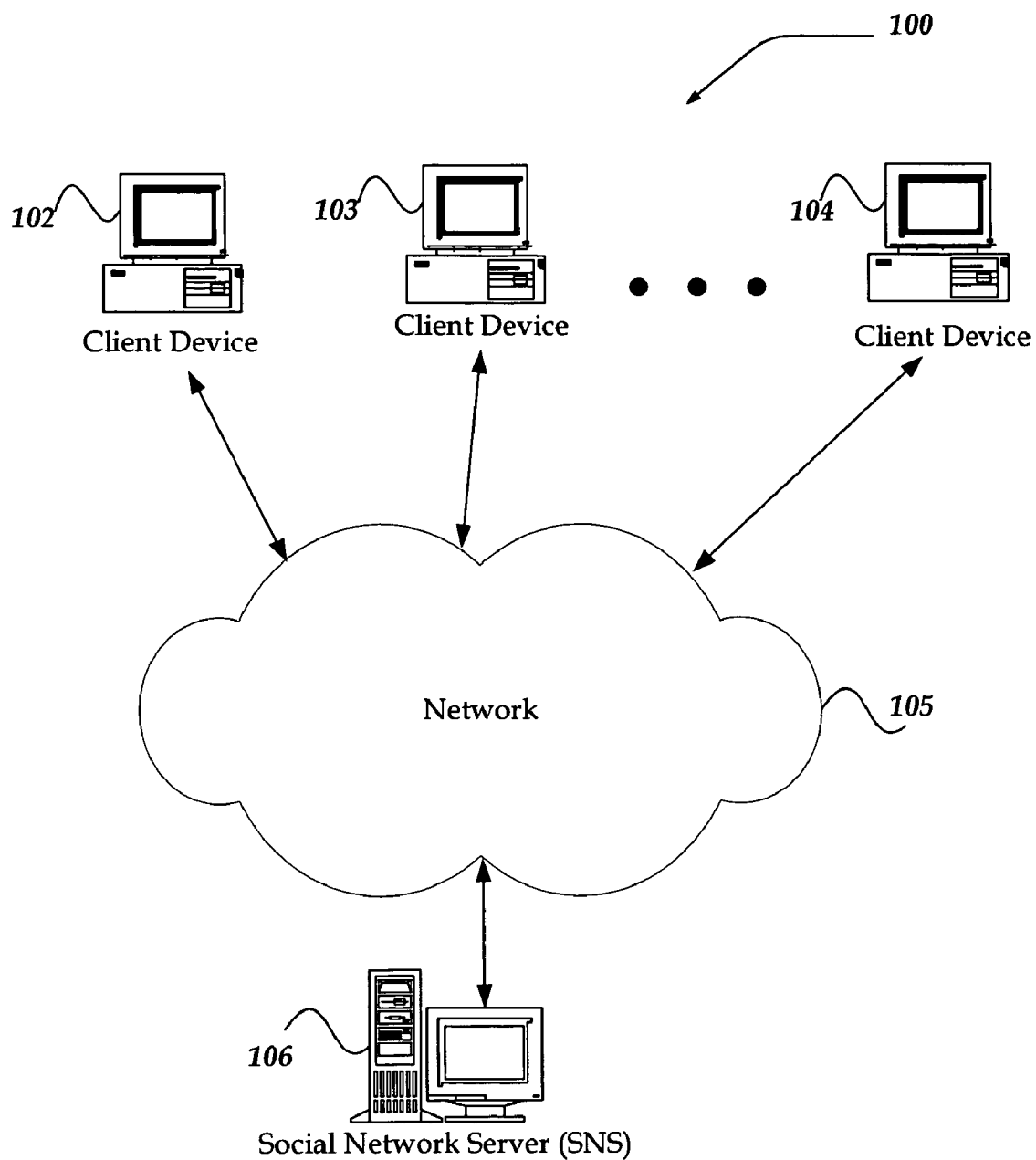
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards providing a system, apparatus, and method for enabling information filtering using measures of affinity of a relationship between subscribers of an online subscriber-based portal. Relationship measurements may be obtained to assess an extent of known online interactions between subscribers of the portal (online social network) system. Any of a variety of online interactions may be tracked, including message communications between subscribers, participation in a buddy list, an instant messaging buddy list, a mailing list, an online discussion group, an activity, a chat group, category, and so forth. Online interactions may also be determined based on names within an address book of a subscriber, names within an address book of another subscriber within the portal system, and the like. In addition to behavior information, such social network information can comprise subscriber-defined information, subscriber behavior information, portal assessment information, and the like. Subscriber-defined information can include contact lists, preferences, survey responses, and other information provided by a subscriber. Subscriber behavior information can also include frequency of visiting Web sites, types of online purchases, types of online communication used most often, duration of participating in online activities, and other information that can be detected about a subscriber's online actions. Portal assessment information may include compliments about a subscriber, complaints about a subscriber, reputation assessments from peer subscribers, comparison between subscriber-defined information, spam detection about the subscriber, and other information determined by others about a subscriber. Many other types of information can be stored and/or determined by an online portal (social network) system regarding a subscriber.

Such interactions and behaviors may be employed to determine a level of trust (or affinity) between subscribers of the portal system. This affinity measurement may be used by a subscriber of the portal system to filter various information, including, but not limited to, product recommendations, ratings, polling queries, advertising, social network communications, personal ads, career opportunities, and so forth. Moreover, this affinity measurement may also be employed to perform message spam detection.

The affinity measurement of the present invention enables an improvement over mere degrees of separation in analyzing a quality of a relationship as it implies a level of trust based on interactions between subscribers. Additionally, the invention enables measuring of various portal-based interactions as a general indication of affinity that then may be leveraged 'horizontally' for a variety of purposes. The invention then is directed further at addressing the limitations of approaches that focus on 'vertical' patterns of conduct, such as purchases of books, music, and so forth.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 100 includes client devices 102-104, a network 105, and a social network server (SNS) 108. Network 105 is in communication with and enables communication between each of client devices 102-104, and SNS 108.

Client devices 102-104 may include virtually any computing device capable of receiving and sending a message over a network, such as network 105, to and from another computing device, such as SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie-talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to receive and to send web pages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to participate in a social network interaction. Client devices 102-104 may also enable the tracking of interactions and other behaviors of its user, which may in turn be saved at a remote location, such as SNS 108, and the like. As such, client devices 102-104 may further include a client application that is configured to manage various actions on behalf of the client device. For example, the client application may enable a user to interact with the browser application, email application, and the like, to establish a subscriber's online portal, to customize an interaction with the online portal, to manage the user's online portal, to customize how another portal system subscriber might view a persona, profile, or the like. For example, the subscriber may employ the client application, in part, to establish and/or modify an online portal profile, to manage a contact list, to interact with online portal services, such as financial information tools, to make online purchase, to store and communicate with contacts, and the like. The subscriber may also employ the client application, in part, to establish and/or modify a portal profile and/or an SNS profile, to establish categories of SNS relationships to provide one customized view of SNS profile information for family subscribers, another customized view for poker subscribers, yet another view for fishing buddies, and the like. The client application may further enable the user to perform searches based on affinity of relationships within the portal system. The results of the affinity search may then be employed for a variety of activities, including, but not limited to determining product recommendations, ratings, polling queries, advertising, spam detections, personal ads, and so forth.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, remote computers and other related electronic devices could be remotely connected to either LANs or WANs via a modem and temporary telephone link. In essence, network 105 includes any communication method by which information may travel between client devices 102-104 and SNS 108.

The media used to transmit information in communication links as described above illustrates one type of computer-readable media, namely wired and/or wireless communication media. Generally, computer-readable media includes any media that can be accessed by a computing device. Computer-readable media may include computer storage media, communication media, or any combination thereof. Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of SNS 108 is described in more detail below in conjunction with FIG. 2. Briefly, however, SNS 108 may include any computing device capable of connecting to network 105 to communicate information between client devices 102-104. Devices that may operate as SNS 108 include personal computers desktop computers, multiprocessor systems, microprocessor-based or programmable consumer electronics, network PCs, servers, and the like. SNS 108 and client devices 102-104 can be arranged in a client-server relationship relative to each other. Client devices 102-104 can also be combined with SNS 108 in virtually any other computing architecture, including, but not limited to a peer-to-peer architecture, and the like, without departing from the scope of the present invention.

SNS 108 may be configured to send and/or make accessible, social network information associated with a portal system subscriber, and configured to enable the portal system subscriber to seek information associated with interactions and other behaviors of other portal system subscribers. As such, SNS 108 may be configured to track social network information and to store such information. Such social network information may include, but is not limited to, subscriber profile information, contact information, relationship category information, an activity, interactions, subscriber-defined information, subscriber information associated with a relationship category, email communications, address book information, behaviors, and the like.

Illustrative Server Environment

Figure 2:
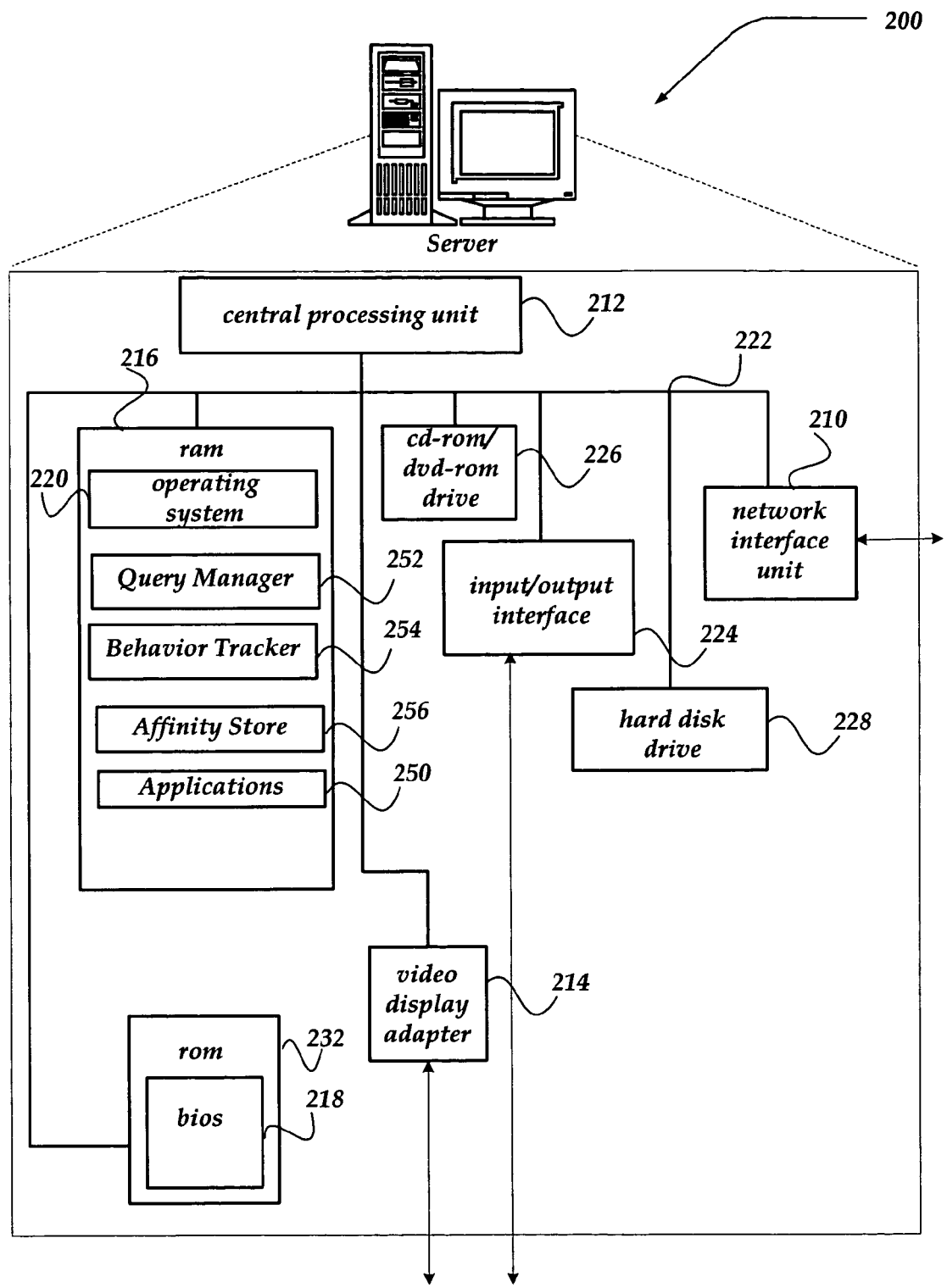
FIG. 2 shows one embodiment of a network device that may be included in a system implementing the invention.

FIG. 2 shows a functional block diagram of an exemplary network device 200, according to one embodiment of the invention. For example, network device 200 can comprise SNS 108. Client devices 102-104 can be similarly configured. Network device 200 may include many more components than those shown. The components shown, however, are sufficient to disclose an illustrative embodiment for practicing the invention.

Network device 200 includes a processing unit 212, a video display adapter 214, and a mass memory, all in communication with each other via a bus 222. The mass memory generally includes RAM 216, ROM 232, and one or more permanent mass storage devices, such as an optical drive 226, a hard disk drive 228, a tape drive, and/or a floppy disk drive. The mass memory stores an operating system 220 for controlling the operation of network device 200. Any general-purpose operating system may be employed. A basic input/output system ("BIOS") 218 is also provided for controlling low-level operation of network device 200. As illustrated in FIG. 2, network device 200 can communicate with the Internet, or some other communications network, such as network 105 of FIG. 1, via a network interface unit 210, which may be constructed for use with any of variety of communication protocols including, but not limited to, transmission control protocol/Internet protocol (TCP/IP), and the like. Network interface unit 210 is sometimes known as a transceiver, transceiving device, network interface card (NIC), and the like. Network device 200 also includes input/output interface 224 for communicating with external devices, such as a mouse, keyboard, scanner, or other input devices not shown in FIG. 2.

Network device 200 may include a simple mail transfer protocol (SMTP) handler application for transmitting and receiving email. Network device 200 may also include a hypertext transfer protocol (HTTP) handler application for receiving and handing HTTP requests, and an HTTP secure sockets (HTTPS) handler application for handling secure connections. The HTTPS handler application may initiate communication with an external application in a secure fashion.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 250 are loaded into mass memory and run on operating system 220. Examples of application programs include email services, schedulers, calendars, web services, transcoders, database programs, word processing programs, spreadsheet programs, and so forth. Mass storage may further include applications such as a query manager 252, behavior tracker 254, and affinity store 256.

Affinity store 256 may include a database, text, folder, file, and the like, that is configured to maintain and store information that identifies a category, an activity, and the like, as well as profile and criteria information for each portal subscriber. Affinity store 256 may further be configured to store information associated with an interaction between subscribers, as well as virtually any behavior of a subscriber.

As such, affinity store 256 may include category information that may represent a classification of subscribers and/or corresponding relationships within a user's social network, such as family subscribers, friends, co-workers, poker buddies, fishing buddies, and the like. Portal system subscribers can establish their own categories and profile information based on corresponding portal profile data and/or manually entered data. Information relating to a category may be accessible to those identified as subscribers of the category. However, the invention is not so limited, and global categories may be established that provide profile information about a portal system subscriber to virtually any other portal system user.

Each category may also include a set of subscriber-definable portal system subscriber information.

As stated above, activities may be stored in affinity store 256. An activity may include virtually any way, manner, and the like, in which a portal system subscriber may select to employ their social network connections. For example, activities may include, but are not limited to, dating, job seeking, reconnecting with military comrades, communicating with fellow alumni, seeking help & advice, and the like. It may be desired, although not required, that an activity be globally configured and managed by the online portal system, and made available to all users of the online portal system. Additionally, at least a minimum set of profile information associated with the activity may be globally established. An activity may further include an optional set of profile information, such as achievements, hobbies, recommendations, and the like.

Portal profile information may also be stored that may include, but is not limited to such information as name, alias, nickname, age, email address, address book, online behaviors, and the like. Portal profile information may also include category profile information, activity profile information and the like. Such additional information may include, but is not limited to, a photograph, a hobby, a job history, a school history, career information, dating information, military information, sports information, religious information, sexual orientation, politics, interests, favorite sites, self description, frequency of accessing a Web site, duration of participating in an online activity, number of purchases made from an online vendor, and the like.

Affinity store 256 may further store information associated with other behaviors and interactions of subscribers of the portal system. Such behavior information may include, but is not limited to, email exchanges, frequency of contact with other subscribers, purchasing habits, and the like. Virtually any information associated with the portal subscriber and associated portal system subscriber may be included within affinity store 256.

Behavior tracker 254 is configured to detect and store information regarding a portal subscriber's online actions and profile characteristics. For example, behavior tracker 254 can detect that a portal subscriber navigated to one or more news Web sites at approximately the same time each day for a current month, spent approximately twenty hours playing an online game during each week of the current month, made purchases from multiple overseas vendors of software, participated in a hacker chat room, performed searches for movie times, sent an email message to a thousand sequential addresses in one day, and/or performed other actions. From these actions, behavior tracker 254 can, assess the accuracy of information provided by the portal subscriber to the online portal, gather feedback about the portal subscriber submitted by other portal subscribers, and perform other tracking and evaluation operations. Behavior tracker 254 might also includes a flag, indicator, and the like, indicating that the portal subscriber might be engaged in spamming. Moreover, another flag might be included that indicates that another subscriber of the online network that may have interacted with portal subscriber was practicing potentially undesirable activity. From such interactions and behaviors, profile information, and the like, behavior tracker 254 may also determine an affinity of relationship or level of trust between subscribers of the portal system. Behavior tracker 254 may employ a relationship graph, such as described below, to determine the affinity of relationship between subscribers of the portal system. However, the invention is not limited to employing the relationship graph, and other mechanisms may be employed to determine the affinity of relationships, without departing from the scope or spirit of the invention. In any event, behavior tracker 254 may employ a process substantially similar to process 400 described below in conjunction with FIG. 4 to manage the affinity of relationship data.

Query manager 252 may be configured to employ information from a variety of sources, including behavior tracker 252, affinity store 256, and the like, to enable a subscriber of the portal system to manage their social networking contacts, develop new contacts, obtain recommendations, as well as to perform such activities as data mining, and the like. For example, in one embodiment, query manager 252 may analyze portal activity, such as a number of email exchanges with the user, and the like, to determine a frequency of contact with the subscriber. This may further include other connections, associations, and the like, including, but not limited to emails, names within an address book of the user, names within an address book of another person within the portal, a buddy list, an instant messaging buddy list, an activity, chat group, and the like. Query manager 252 may then provide the collected information to a subscriber in response to a search query for use in the subscriber's further actions. Query manager 252, for example, may employ a process substantially similar to process 500 described below in conjunction with FIG. 5 to provide the information to a subscriber.

Although illustrated in FIG. 2 as distinct components in network device 200, query manager 252, behavior tracker 254, and affinity store 256 may be arranged, combined, and the like, in any of a variety of ways, without departing from the scope of the present invention. For example, affinity store 256 may be arranged as separate components, such as an activity store and a category store, or the like. Moreover, contact manager 252, behavior tracker 254, and/or affinity store 256 may reside in one or more separate computing devices, substantially similar to network device 200.

Figure 3:
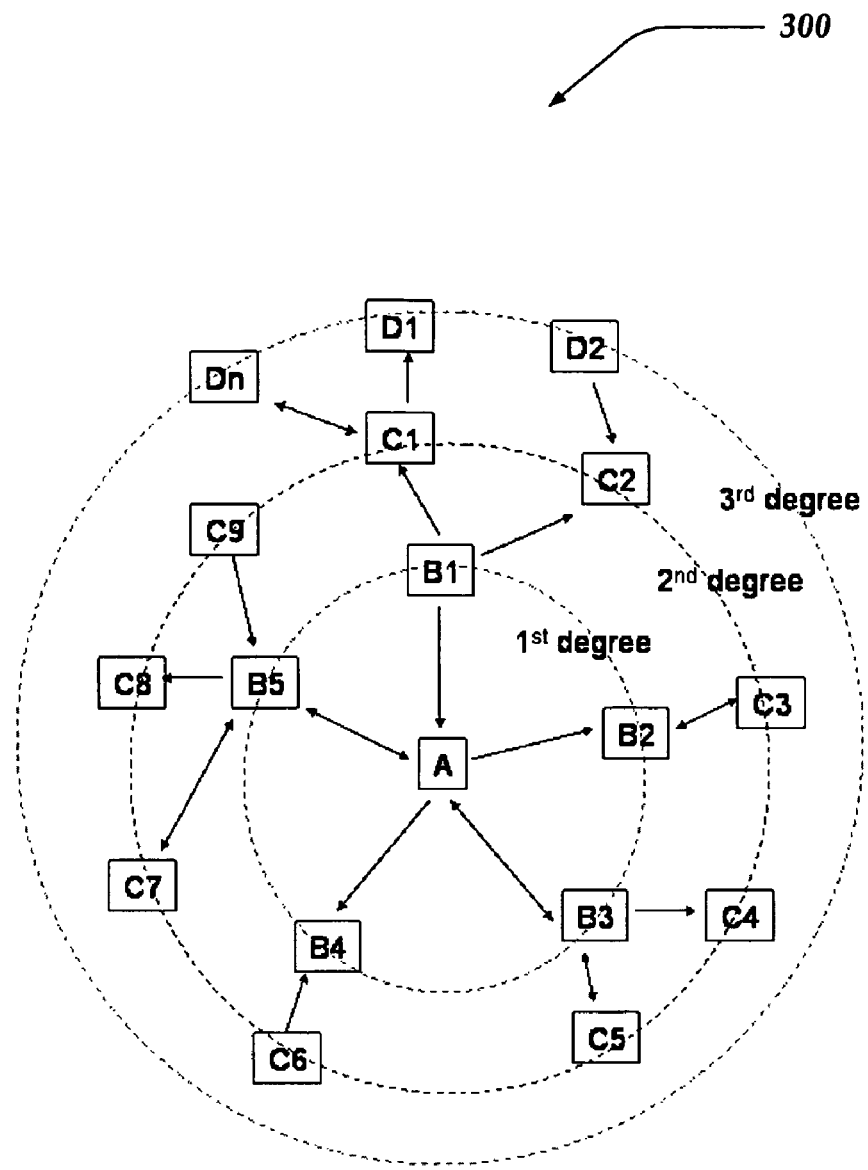
FIG. 3 illustrates one embodiment of an online relationship graph.

FIG. 3 illustrates one embodiment of a relationship graph, according to the invention. Such relationship graph, as well as other information, may be employed by the SNS 108 of FIG. 1 to obtain measures of an affinity between subscribers. Thus, shown in the figure is one example of interactions between, portal system subscribers A, B1-B5, C1-C9, and D1-Dn. The illustrated example of interactions employs email addresses to form what may be known as a directional graph. However, the relationship graph may be constructed employing virtually any of a variety of other characteristics of portal system subscribers. In any event, the directional graph may be employed to determine relationship information between portal system subscribers. As shown in the figure, the directional graph has portal system subscriber A as a focal point, with portal system subscribers B1-B5, C1-C9, and D1-Dn arranged to represent their relationship with respect to each other and to portal system subscriber A. Placement within the directional graph may be determined based on a variety of criteria. For example, B1-B5 may be placed closer than C1-C9 to A because A's address book may include B1-B5s' email addresses, but not C1-C9s' email addresses. Similarly, such an arrangement may arise based on participation within an activity, group, a buddy list, category, instant messaging group, and the like. From directional graph 300 a degree of separation between portal system subscribers may then be determined.

A degree of separation may be defined as how far two portal system subscribers are separated on the directional graph. For example, as shown in FIG. 3, portal system subscribers A->B->C1-C9->D1-Dn. Also seen is that portal system subscribers A and B have one degree of separation. Similarly, portal system subscribers A and C1-C9 have two degrees of separation, and portal system subscribers A and D1-Dn have three degrees of separation. Typically, as degrees of separation for two portal system subscribers get larger in magnitude, a possible relationship strength between them may become weaker. Thus, from relationships such as illustrated in directional graph 300, a relationship trust rating may be determined between two or more portal system subscribers, and the like.

Additionally, based on the interaction between portal system subscribers another trust rating may be determined. This trust rating may represent how much portal system subscriber A, for example, is trusted by another portal system subscriber, such as B, based on their interactions. That is, if a portal system subscriber A is positively related with portal system subscriber B (A->B), A may be considered to be somewhat trusted by B. This may be because B and A are both subscribers of the same activity, group, category, instant messaging group, and the like. As such, there is a further level of trust between A and B, even though A and B may not have directly communicated with each other.

If B is also positively related with another portal system subscriber, say C1 (B->C1), then B may be said to be somewhat trusted by C1. From this, A may be trusted by C1 in some way even though A and C1 have not interacted in the past. This may arise where A and B are subscribers of one activity, and B and C1 are subscribers of another activity. Thus A and C1 may be able to establish a relationship strength based on their common relationship to B. Thus, if A sends a message to C1, C1 might be able to treat A's message with some level of preference. Similarly, C1 may elect to search for information that may include a subset of information from A. Any of a variety of models may be employed to describe this trust relationship between portal system subscribers, and similarly, to determine a trust based on this relationship strength.

Moreover, the relationship trust and the relationship strength may be employed, alone, or in combination, to determine an overall level of trust or affinity that may then be employed to enable filtering of any of a variety of information, including, but not limited to, email messages for spam detection and the like, as well as to perform searches within the affinity store for any of a variety of information. For example, a search may be performed seeking to know what books subscribers of my fishing category have purchased. As such, the present invention enables leveraging portal-based behavior information between portal system subscribers to perform more trustworthy and selective inquiries.

An Embodiment of a Behavior Tracking Process

Figure 4:
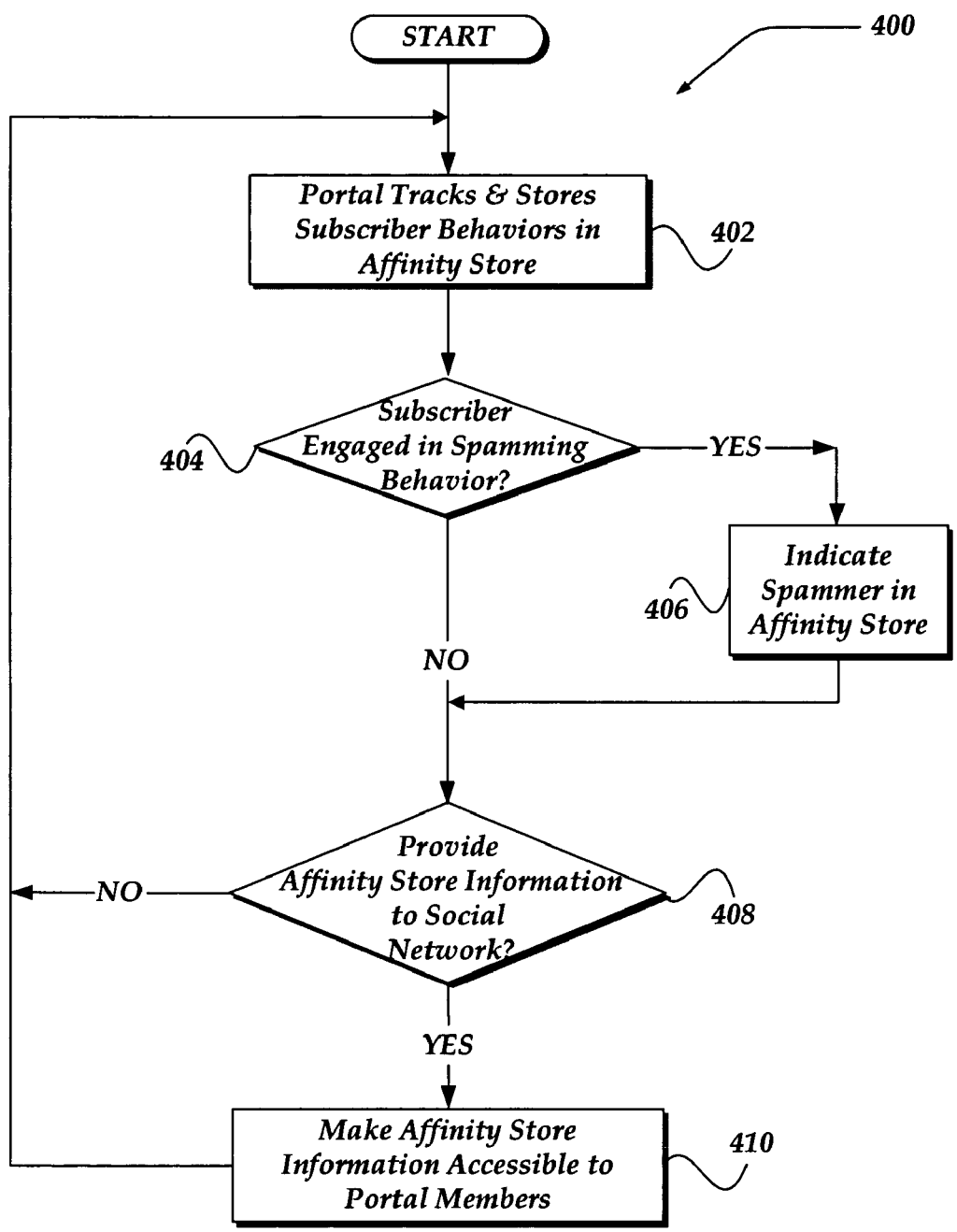
FIG. 4 illustrates a logical flow diagram generally showing one embodiment of a process for an online subscriber-based portal system to track subscriber behavior information.

The operation of certain aspects of the present invention will now be described with respect to FIGS. 4-5. Briefly, FIG. 4 illustrates a logical flow diagram generally showing one embodiment of a process for an online portal system to track subscriber information. Process 400 of FIG. 4 may be implemented, for example, within SNS 108 of FIG. 1.

The process is typically entered, after a start block, when a subscriber registers with an online portal. Initially, a subscriber's portal profile may only include a user ID. However, the subscriber can enter other information such a name, age, preferences, interests, contact list, and the like. The entered information may be stored in an affinity store and is usually accessible to the subscriber. Typically, with the subscriber's consent, the online portal tracks and stores the subscriber's behavior in the affinity store, at block 402. Some, or all, of the tracked information can be accessible to, or hidden from, the subscriber. In addition, the portal can add information to the affinity store indicating characteristics, possible interests, and/or other information determined about the subscriber. For example, the portal can determine that the subscriber uses the portal mostly to read news, mostly to find a job, mostly to write blogs, and/or other usage habits. Additionally, if the subscriber selects to join an activity, a group, online club, and the like, such information may also be collected and stored in the affinity store. If the subscriber receives, sends messages to another subscriber, such information may also be tracked. Moreover behavior information that is tracked and analyzed can include frequency of visiting Web sites, types of online purchases, types of online communication used most often, duration of participating in online activities, and other information that can be detected about a subscriber's online actions. Thus, virtually any actions, interaction, behavior, and the like may be tracked. Furthermore, at block 402, the tracked information may be employed to determine an affinity of relationship between subscribers. The determined affinity of relationships may then be stored in the affinity store.

Moving to decision block 404, the portal can use some of the above information to determine whether the subscriber has engaged in spamming behavior, and/or other behavior that is deemed undesirable by portal operators, by other subscribers, by law, and the like. Spamming behavior or other undesirable behavior may be determined based on the information obtained in block 402, as well as information obtained about the subscriber received from other subscribers, complaints about the subscriber, reputation assessments from peer subscribers, spam detection about the subscriber, spam reports, and other information determined by others about the subscriber. In any event, if it is determined that the subscriber has engaged in undesirable behavior, such as spamming, the portal can indicate this fact in the subscriber's affinity store, at block 406. Such undesirable behavior may also be employed to determine an affinity of relationships, which may in turn be stored in the affinity store. Moreover, other actions may also be taken, as desired, including, but not limited to, warning the subscriber, sanctioning the subscriber, terminating the subscriber's access to the portal, and the like.

Whether or not the network subscriber has engaged in undesirable behavior, the process moves to decision block 408, where a determination is made whether the information already obtained through the portal is be provided to the subscriber. If the portal information is not being provided, portal process 400 returns to block 402 to continue tracking the subscriber's behavior. Otherwise, the portal process proceeds to block 410, the affinity store can then be made accessible to a subscriber, such as described below in conjunction with FIG. 5. Portal processing may then return to block 402 to continue tracking the subscriber's behaviors.

Figure 5:
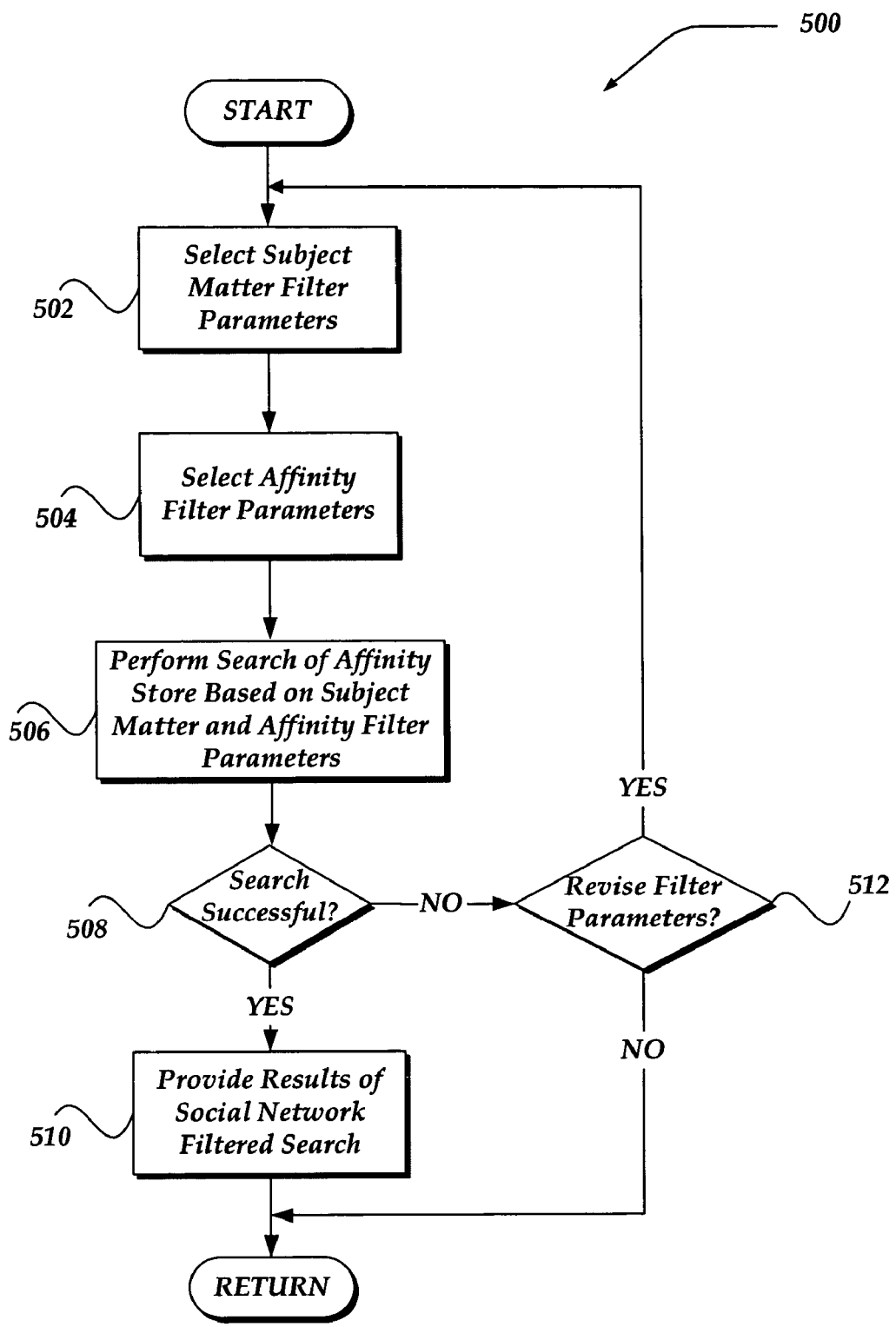
FIG. 5 illustrates a logical flow diagram generally showing one embodiment of a process for filtering information based on an affinity of a relationship derived, in part, from behaviors of subscribers in the online portal system, in accordance with the present invention.

FIG. 5 illustrates a logical flow diagram generally showing one embodiment of a process for filtering information based on an affinity of a relationship derived, in part, from the online portal, in accordance with the present invention. Process 500 of FIG. 5 may be implemented, for example, in SNS 108 of FIG. 1.

Process 500 begins, after a start block, at block 502 where a subscriber seeks to perform a search by filtering social network information based, in part, on an affinity between subscribers. For example, the subscriber may seek information associated with all the books that may be been purchased by other subscribers in a category of hockey buddies that the subscriber created. Thus, at block 502, the subscriber may select the subject matter to filter the search. Using the above example then, the subject matter may be purchased books. Clearly, however, the subscriber is not constrained to books as the subject matter filter parameter, and virtually any subject matter may be selected.

Processing continues to block 504, where the subscriber selects an affinity filter parameter. In the example, the affinity filter parameter may include the subscriber's hockey buddy category. The subscriber may also include a variety of other parameters, including for example, a selection to exclude any results associated with a hockey buddy that has been spamming, is in a bridge category, or the like. It should be apparent then, that virtually any affinity filter parameters and/or combinations of filter parameters may be selected. Processing flows next to block 506, where a search is performed of the affinity store based, in part, on the filter parameters selected at blocks 502 and 504.

Process 500 continues next to decision block 508, where a determination is made whether the search is successful. Success may be determined based on any of a variety of criteria, including, but not limited to a subjective determination by the subscriber. In any event, if the search is successful, processing branches to block 510; otherwise, processing branches to decision block 512, where the subscriber may decide to revise a filter parameter. If a filter parameter is to be revised, processing loops back to block 502; otherwise, processing returns to a calling process, to perform other actions.

At block 510, the results of the affinity-based filtered search is provided to the portal system subscriber for use in any of a variety of activities, including, but not limited to performing additional filtered searches, growing relationships, and otherwise horizontally leveraging such portal-based affinity information.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the operations indicated in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the indicated actions, combinations of steps for performing the indicated actions and program instruction means for performing the indicated actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method of sharing information between a plurality of subscribers of an online social network with a processing device that enables actions, comprising:
   employing the processing device to determine a relationship trust based that is based at least in part on behavioral information about at least one behavior of each subscriber in the plurality of subscribers of the online social network, wherein the behavioral information includes at least tracked online activities of each subscriber that is both indirect of the tracked online activity and separate from an interaction or communication with another subscriber in the plurality of subscribers;
   employing the processing device to determine a relationship strength between each of the plurality of subscribers of the online social network, wherein the relationship strength is based at least in part on a degree of separation between each of the plurality of subscribers;
   employing the processing device to determine an affinity of a relationship between a subscriber and each of the other subscribers in the plurality of subscribers of the online social network based, in part on the relationship strength and the relationship trust that is based on the determined behavioral information that includes at least the tracked online activities separate from an interaction or communication with another subscriber;
   employing the processing device to receive an input query and an affinity filter parameter from the subscriber of the online social network, wherein the input query is a request for information and the affinity filter parameter specifies a subset of the plurality of subscribers;
   employing the processing device to search through the determined behavioral information and generate a result based at least in part on the input query, the affinity filter parameter, and the determined affinity of the relationship, wherein the affinity filter parameter based on a separate selection for each of the relationship trust and the relationship strength; and
   employing the processing device to provide the result of the searching to the subscriber of the online social network that includes actual information requested by the input query, wherein the actual information being based on at least one behavior of the other subscribers in the subset of the plurality of subscribers.

2. The method of claim 1, wherein the tracked online activities that are independent of an interaction or communication further comprises tracking at least one of a frequency with which each subscriber accessed at least one of a portal service and a non-portal Web site, a duration over which the subscriber accessed at least one of the portal service and the non-portal Web site, a content type accessed by each subscriber through at least one of the portal service and the non-portal Web site, a portal assessment, and an online purchase made by each subscriber through at least one of the portal service and the non-portal Web site.

3. The method of claim 1, wherein determining the behavioral information further comprises tracking at least one of communicating a message between the subscriber and another subscriber, participation in a group, a buddy list, a contact list, and an activity.

4. The method of claim 1, wherein the behavior of each subscriber further comprises participating in at least one of an online friend matching service, an online dating service, an online job searching service, an online classmate searching service, an online military colleague searching service, an online club, an online financial service, an online auction, and an online purchase.

5. The method of claim 1, further comprising:
   employing the processing device to determine whether each subscriber has engaged in spamming; and
   employing the processing device to indicate in the behavioral information if each subscriber has engaged in spamming.

6. The method of claim 1, wherein the affinity of the relationship is further based at least one of multiple degrees of separation between the subscriber and other members of the online social network, and a shared interest among members of the online social network.

7. The method of claim 1, wherein determining the affinity of the relationship further comprises determining an affinity measurement based on at least a relationship of an implied level of trust.

8. The method of claim 1, wherein the search results further comprise at least one of product recommendations, ratings, polling queries, advertising social network communications, personal ads, and career opportunities.

9. A server for communicating information between a plurality of subscribers of an online social network, comprising:
   a transceiver for receiving and sending information to a computing device;
   a processor in communication with the transceiver; and
   a memory in communication with the processor and storing data and machine instructions that cause the processor to perform a plurality of operations, including:
      determining a relationship trust based that is based at least in part on behavioral information about at least one behavior of each subscriber in the plurality of subscribers of the online social network, wherein the behavioral information includes at least tracked online activities of each subscriber that is both indirect of the tracked online activity and separate from an interaction or communication with another subscriber in the plurality of subscribers;
      determining a relationship strength between each of the plurality of subscribers of the online social network, wherein the relationship strength is based at least in part on a degree of separation between each of the plurality of subscribers;
      determining an affinity of a relationship between a subscriber and each of the other subscribers of the online social network based, in part on the relationship strength and the relationship trust that is based on the determined behavioral information;
      receiving an input query and an affinity filter parameter from the subscriber, wherein the input query is a request for information;
      searching through the determined behavioral information based on the input query and the affinity filter parameter, wherein the affinity filter parameter is based on a separate selection for each of the relationship trust and the relationship strength;
      obtaining actual information that satisfies the search, wherein the actual information is collective information from more than a single other subscriber within the plurality of subscribers; and
      providing directly to the subscriber the collective actual information.

10. The server of claim 9, wherein determining the behavioral information further comprises tracking at least one of communicating a message between the subscriber and the other subscriber, participation in a group, a buddy list, a contact list, and an activity.

11. The server of claim 9, wherein determining the affinity of the relationship further comprises employing a relationship graph.

12. The server of claim 9, where determining the affinity of the relationship further comprises determining an affinity measurement based on at least a relationship trust of an implied level of trust.

13. The server of claim 9, where determining the affinity of the relationship further comprises determining a relationship trust and a relationship strength, and combining the relationship trust and relationship strength to determine the affinity.

14. The server of claim 9, wherein providing the portion of the search results further comprises providing the portion of information to a mobile device.

15. The server of claim 9, wherein searching through the determined behavioral information further comprises performing a search using the determined affinity of the relationship to filter the determined behavioral information.

16. The server of claim 9, wherein searching through the determined behavioral information further comprises performing a search using the determined affinity of the relationship and a subject matter to filter the determined behavioral information.

17. A computer readable storage medium having computer readable instructions thereon for accessing portal subscriber behavioral information between a plurality of portal subscribers of an online social network, that when executed within a computing device performs actions, comprising:
   enabling the computing device to determine a relationship trust based that is based at least in part on tracking portal subscriber behavioral information based at least in part on a behavior of each of the plurality of portal subscribers, wherein the behavioral information includes at least tracked online activities of each portal subscriber that is both indirect of the tracked online activity and separate from an interaction or communication with another portal subscriber in the plurality of portal subscribers;
   enabling the computing device to determine a relationship strength between each of the plurality of subscribers of the online social network, wherein the relationship strength is based at least in part on a degree of separation between each of the plurality of subscribers;
   enabling the computing device to enable a determination of an affinity of a relationship between each portal subscriber and each other portal subscriber in the plurality of portal subscribers based on the relationship strength and the relationship trust that is based on the tracked behavioral information;
   enabling the computing device to receive an input query and an affinity filter parameter from a portal subscriber, wherein the input query is a request for information;
   enabling the computing device to search through the determined behavioral information based on the input query and the affinity filter parameter, wherein the affinity filter parameter is based on a separate selection for each of the relationship trust and the relationship strength;
   enabling the computing device to obtain actual information that satisfies the search, wherein the actual information is collective information from more than a single other portal subscriber within the plurality of portal subscribers; and
   enabling the computing device to provide directly to the requesting portal subscriber the collective actual information.

18. The computer readable storage medium of claim 17, wherein providing the search results further comprises accessing the provided search results from a mobile device.

19. The computer readable storage medium of claim 17, wherein enabling the determination of the affinity of the relationship further comprises, determining an affinity measurement based on at least a relationship of an implied level of trust.

20. The computer readable storage medium of claim 17, wherein the behavior of the subscriber further comprises participating in at least one of an online friend matching service, an online dating service, an online job searching service, an online classmate searching service, an online military colleague searching service, an online club, an online financial service, an online auction, an activity, a category, a chat session, an instant messaging session, an email communication, and an online purchase.

21. An apparatus for accessing portal subscriber information between a plurality of subscribers of an online social network, comprising:
- a memory for storing processor readable data;
- a network interface for communicating with the plurality of subscribers of the online social network; and
- a processor that executes the stored data to enable a plurality of modules to perform actions, comprising:
  - a first module that is arranged to determine a relationship trust based that is based at least in part on tracking portal subscriber behavioral information based at least in part on a behavior of each portal subscriber in the plurality of portal subscribers, wherein the behavioral information includes at least tracked online activities of each portal subscriber that is both indirect of the tracked online activity and separate from an interaction or communication with another portal subscriber in the plurality of portal subscribers;
  - a second module that is arranged to determine a relationship strength between each of the plurality of subscribers of the online social network, wherein the relationship strength is based at least in part on a degree of separation between each of the plurality of subscribers;
  - a third module that is arranged to determine an affinity of a relationship between each portal subscriber and each other portal subscriber in the plurality of portal subscribers based on the relationship strength and the relationship trust that is based on the tracked behavioral information;
  - a fourth module that is arranged to receive an input query and an affinity filter parameter from a portal subscriber, wherein the input query is a request for information;
  - a fifth module that is arranged to search through the determined behavioral information based on the input query and the affinity filter parameter, wherein the affinity filter parameter is based on a separate selection for each of the relationship trust and the relationship strength;
  - a sixth module that is arranged to obtain actual information that satisfies the search, wherein the actual information is collective information from more than a single other portal subscriber within the plurality of portal subscribers;
  - a seventh module that is arranged to provide directly to the requesting portal subscriber the actual information; and
  - an eighth module that is arranged to provide at least a portion of the search results to at least one other subscriber of the online social network, wherein the search results describe at least one behavior.

* * * * *

UNITED STATES PATENT AND TRADEMARK OFFICE
CERTIFICATE OF CORRECTION

PATENT NO.        : 7,707,122 B2                              Page 1 of 1
APPLICATION NO.   : 10/946636
DATED             : April 27, 2010
INVENTOR(S)       : Mark Everett Hull et al.

It is certified that error appears in the above-identified patent and that said Letters Patent is hereby corrected as shown below:

On cover page, item (73), in column 1, in "Assignee", line 1, delete "Yahoo ! Inc." and insert -- Yahoo! Inc. --, therefor.

Signed and Sealed this
Twenty-second Day of February, 2011

David J. Kappos
*Director of the United States Patent and Trademark Office*